Patented Feb. 11, 1930

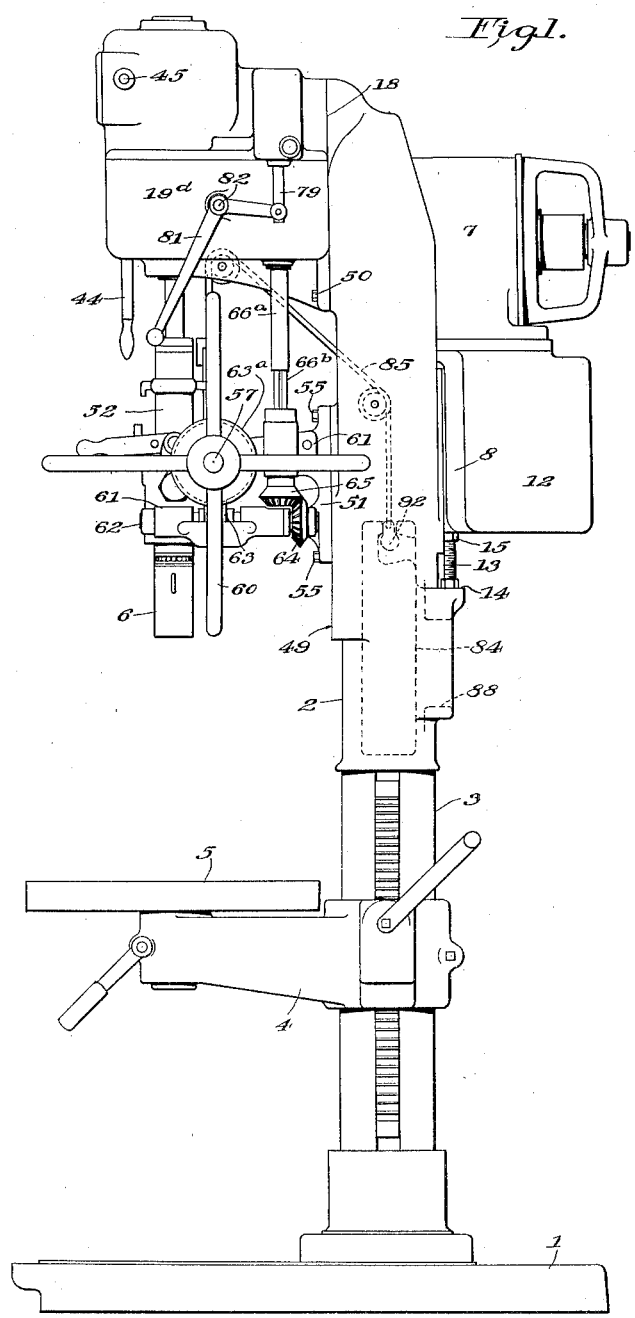

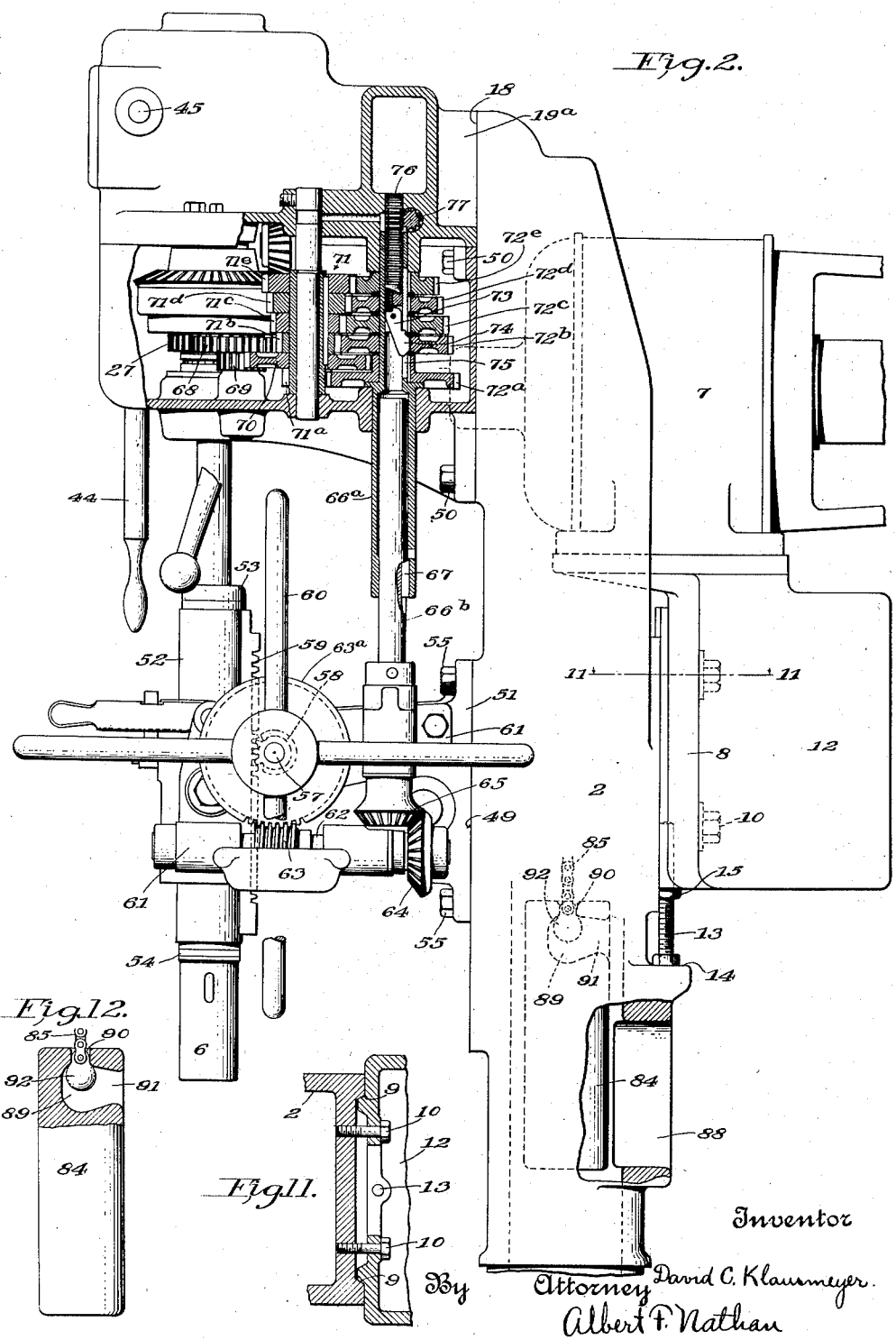

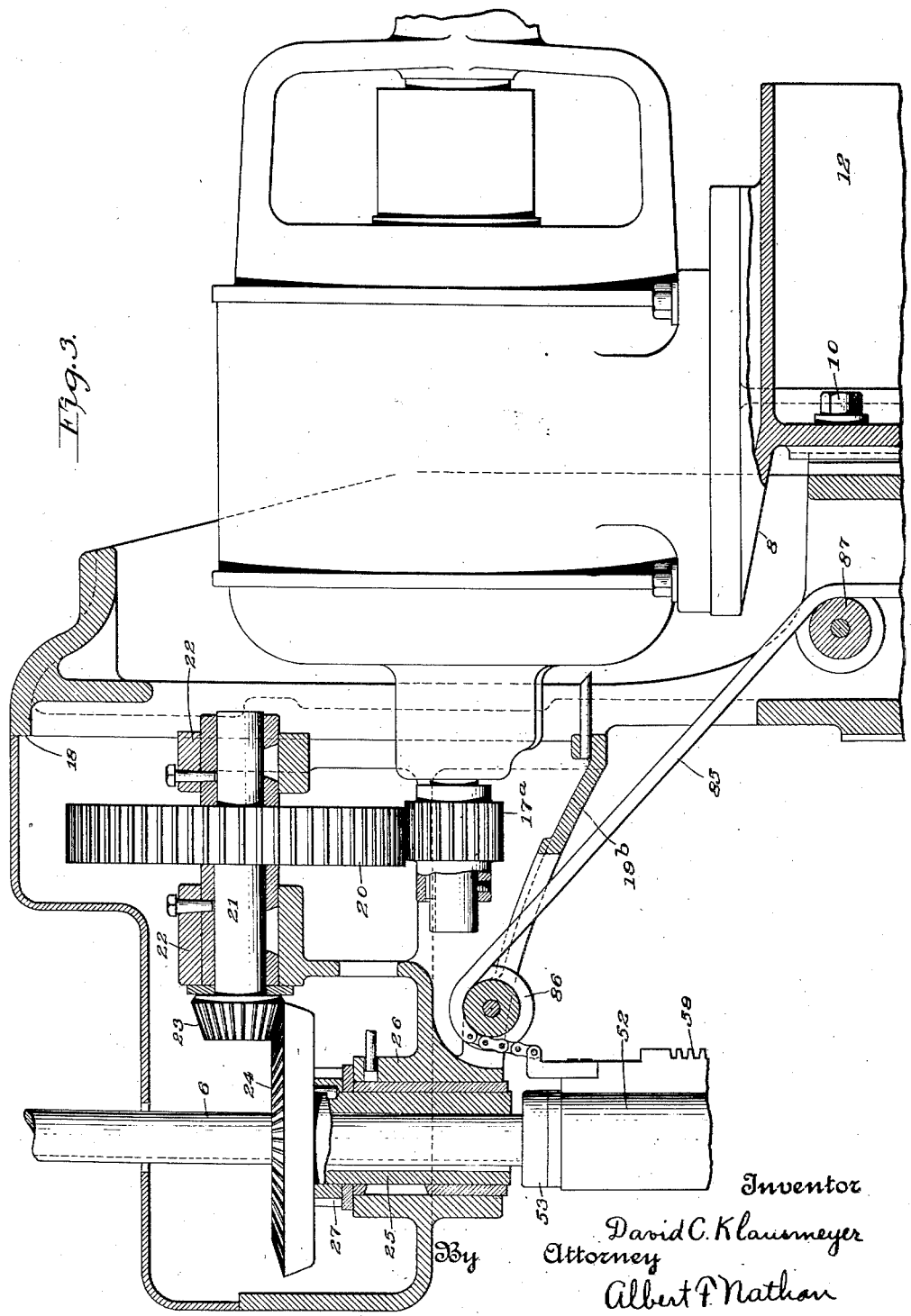

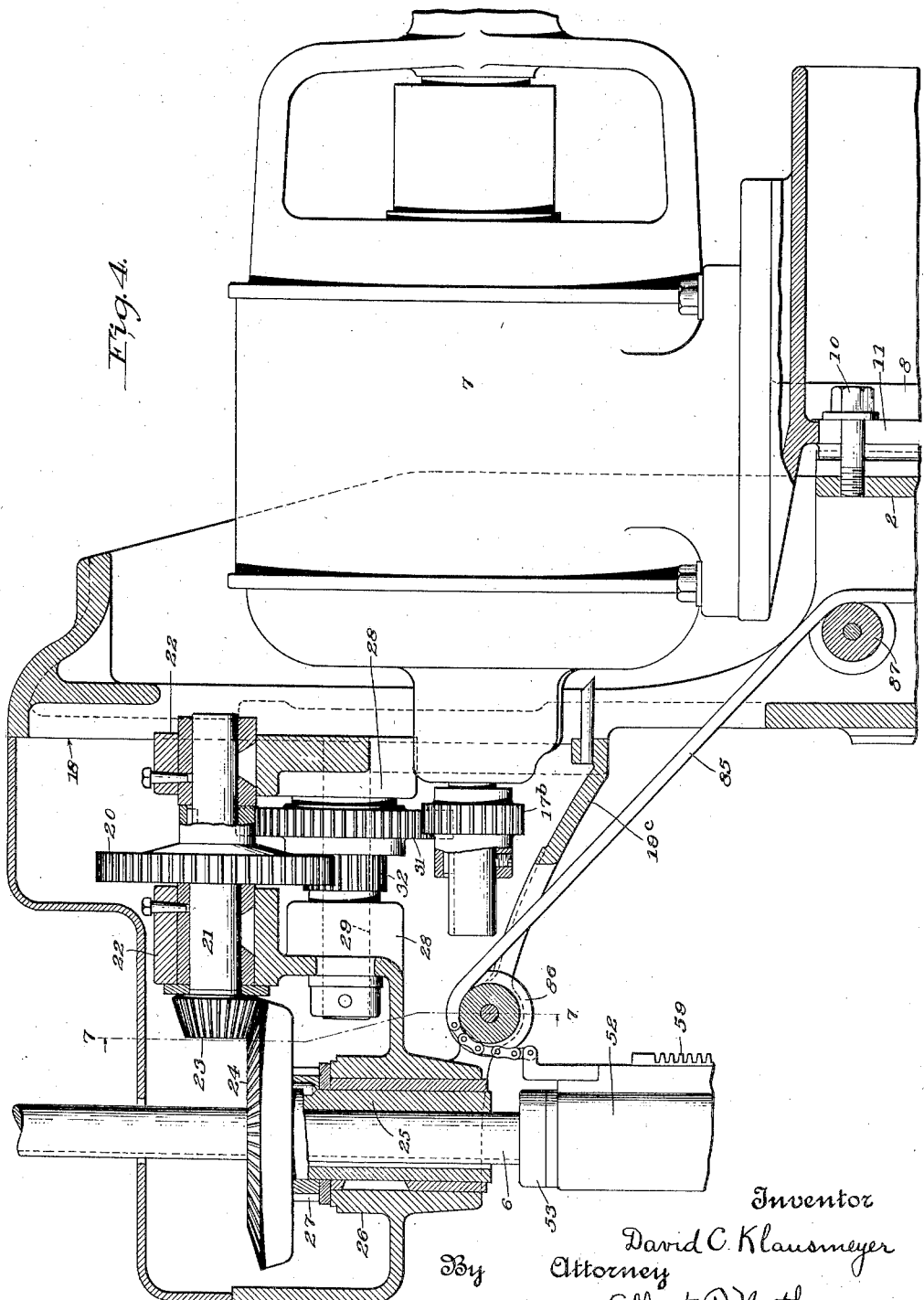

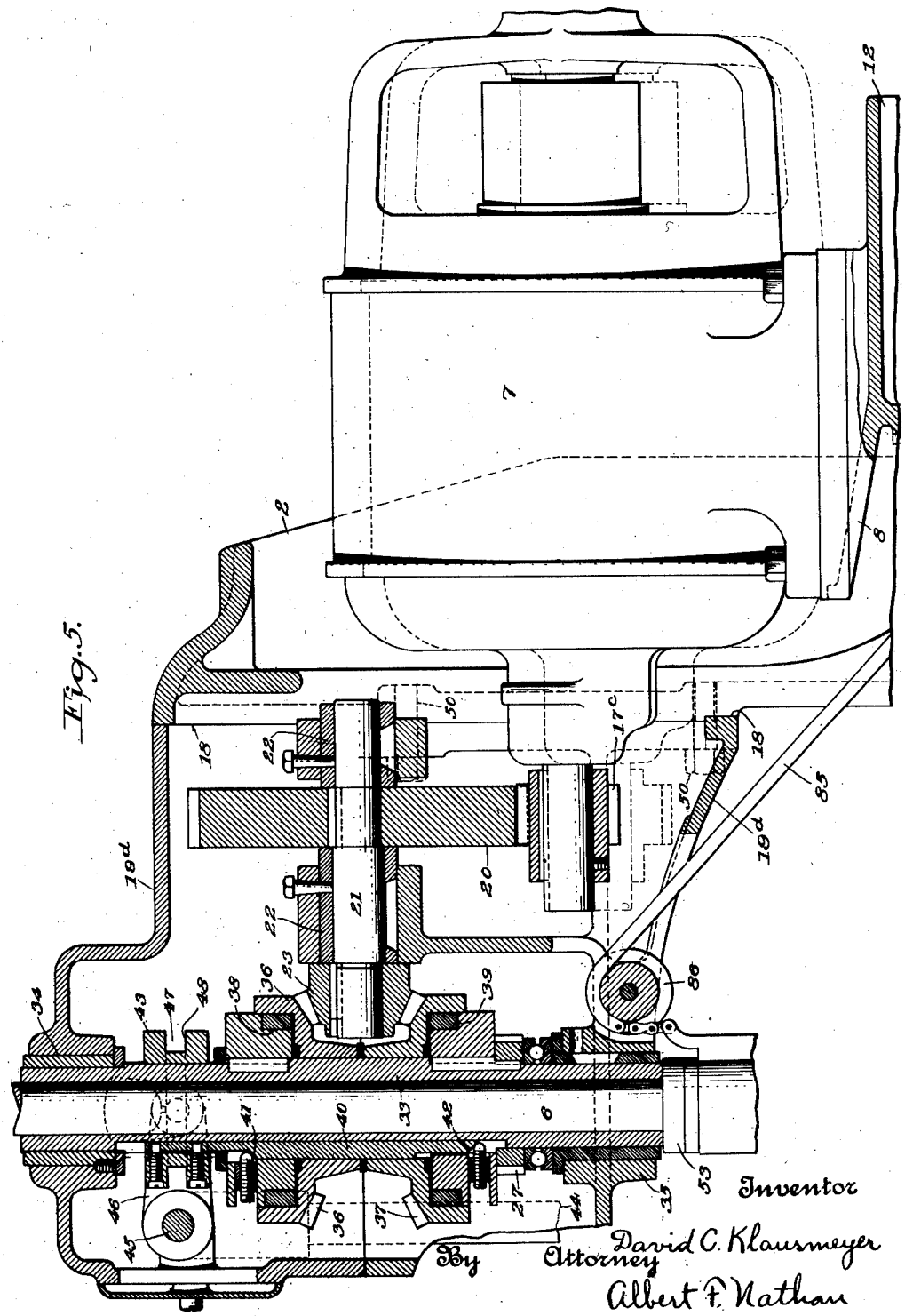

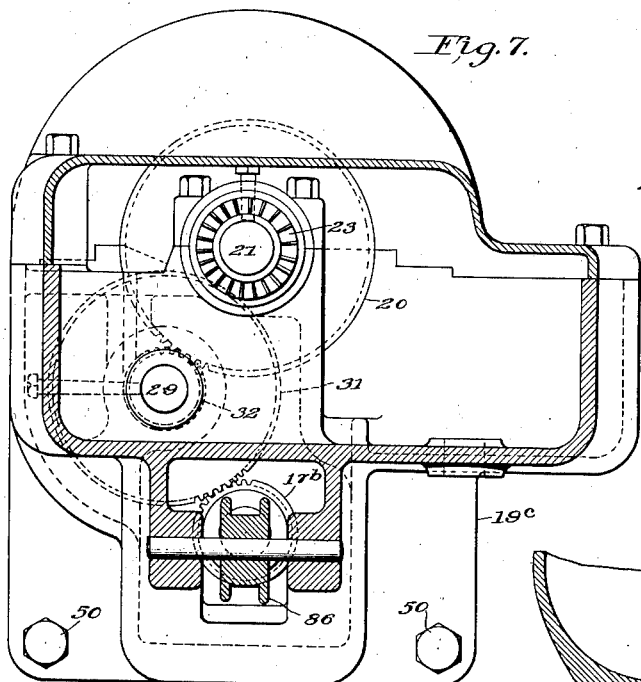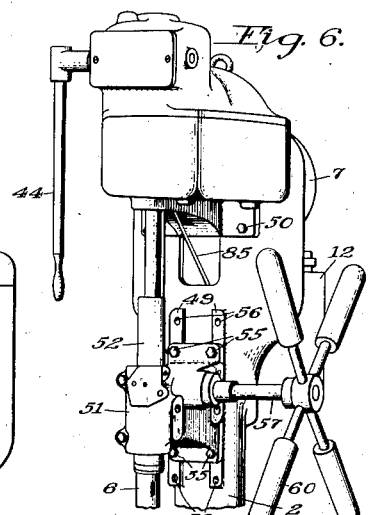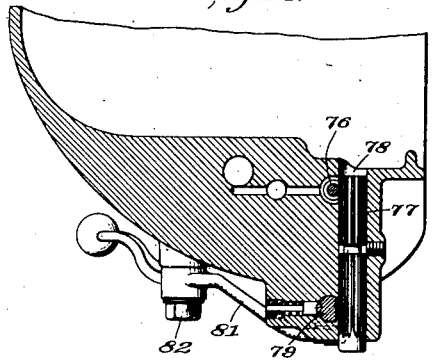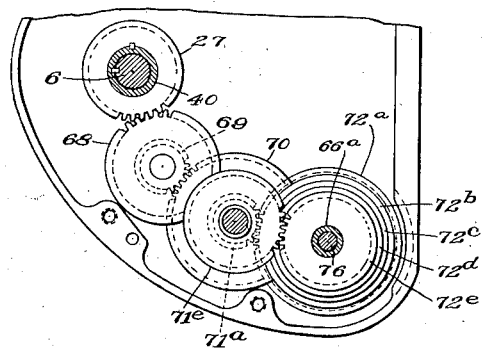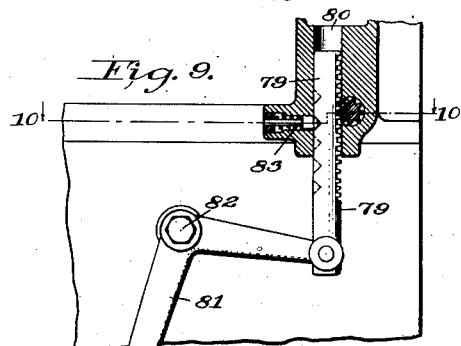

1,746,263

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

DIRECT-DRIVE DRILL

Application filed February 10, 1925. Serial No. 8,185.

This invention relates to upright drilling and tapping machines and it has for an object to provide such a machine tool which, while embodying all of the advantages of a single-purpose tool, may readily be so converted as to adapt it to perform operations for which previously it was not adapted.

Another object of this invention is to provide an upright drilling machine in which power means to rotate the drill spindle is located wholly at the upper end of the standard, thereby eliminating, from the region about the base of the tool, certain driving mechanism which heretofore has been a constant source of danger to the operator.

Another object of this invention is to provide a driving mechanism for the spindle of upright drilling machines which is simple in construction, compact in arrangement and which is so located that it is entirely out of the way of the operator; thereby materially reducing the space required for the installation and operation of each machine and proportionately increasing the number of machines that may be installed in a given area.

Still another object of this invention is to provide an upright drilling machine in which an upright standard is adapted adjustably to support, adjacent its upper end, a driving motor and any one of a plurality of interchangeable spindle-supporting brackets, each of which is equipped with a different spindle driving train, and so to adjust the motor as to cause it to be brought into driving relation with said trains.

A further object of the invention is to provide means whereby the ratio between a driving gear, carried by the motor shaft, and a driven gear forming a part of the gear train, may readily be changed to vary the speed of rotation of the spindle from a constant speed in the motor.

A still further object of the invention is to provide new and improved means for translating the tool spindle.

Under present-day methods of manufacture, and especially in factories where great numbers of duplicate parts are produced, it has been found advantageous to utilize machine tools particularly constructed to effect only a few very similar operations and in some instances, only a single operation; as distinguished from machine-tools which, by complicated adjustments, speed change mechanism etc., may be utilized to perform a great number and a large variety of operations. It will readily be perceived that a single purpose machine tool may be much simpler in construction and therefore less costly to install and operate than a universal machine. Therefore, where production warrants the installation of a greater number of machines, single-purpose machines are desirable.

While single-purpose machine tools are generally conceded to be more efficient for quantity production there are, however, certain times and conditions that make it desirable to have these machines adaptable to changes or alterations which fit them for new and different operations. This invention therefore proposes an upright drill which, by the bodily removal of a certain bracket, or casing, carrying a spindle and a suitable train of spindle-driving gears, and the subsequent attachment of a similar part having a different spindle drive, the drill may be utilized for an operation for which previously it was not adapted.

This interchangeability of the spindle supporting and driving bracket not only permits the user, at a nominal cost, to equip a single purpose drill so as to adapt it to perform additional operations but it also permits the manufacturer to construct, in large numbers, the entire drills with the exception of the spindle supporting and driving bracket and subsequently to attach a suitable bracket to give any spindle drive as required by the varying demands of the trade.

As used throughout this specification, the term "single purpose" is not to be construed literally but rather as designating the adaptability of a machine tool to perform only such operations as may be performed at a predetermined speed and direction of rotation of the tool spindle.

The objects of this invention have been attained in an upright drilling and tapping machine comprising a base, and a standard rising from said base and designed to have removably attached to it at its upper end any one of a plurality of interchangeable spindle supporting and driving brackets. These brackets are preferably, but not necessarily, in the nature of casings and each is fitted with a driving connection, preferably a train of gears of which one is adapted to be meshed with a driving gear carried by a suitable motor or other prime-mover adjustably carried by the standard, also adjacent its upper end. These driving connections afford means to rotate the spindle at materially different speeds and in reverse directions. For example, one bracket may be so fitted as to produce a direct high speed drive from the motor to the spindle; another may include speed reduction gearing which serves to rotate the spindle at a materially slower rate from the same motor speed; and still another may be fitted with reversing mechanism by means of which the spindle may be caused to rotate in reverse directions. This latter construction is desirable when the machine tool is to be used for tapping, inasmuch as the reverse direction of the spindle may be utilized to unscrew the tap from its tapped hole. The driving gear is preferably removably secured upon the motor shaft and the motor is preferably adjustably mounted on the standard. By means of this arrangement various sizes of driving gears may be secured upon the motor shaft thereby varying the ratio between the driving gear and the initial gear of the spindle driving train.

Adjacent its upper end the column is enlarged to form a housing adapted to receive the motor as shown more clearly in Figs. 3 and 6, later to be referred to. The front and rear walls of this housing are provided with portals through which the motor extends from the back of the column, across the vertical axis thereof, to the front of the column where it is operatively connected with the spindle. This supporting of the motor, with a substantial portion thereof located within a housing provided by the column, produces a compact construction which is very rigid, which permits of a direct connection between the motor and the spindle and which is neat in appearance, inasmuch as the motor is embodied in the machine frame and not merely attached thereto as a separate and distinct element. Furthermore this construction permits of ready removal of the built-in motor for repairs etc., it being only necessary to remove the bolts which hold the motor to its supporting bracket and then to draw the motor rearwardly out of the motor housing.

Both power and manual means are provided for translating the tool-spindle. A portion of the power feed is preferably carried by a feed bracket removably secured upon a feed head attached to the standard. This feed bracket and the power feed mechanism may be eliminated whenever it is desired to have a machine fitted for hand feed only.

This location of the spindle driving motor at the top of the standard renders it possible to employ very compact and direct driving connections between the prime-mover and the spindle. It also eliminates all driving mechanism from the base at the foot of the standard where heretofore it has usually been located and where it was a constant source of danger and annoyance to the operator.

Furthermore a drill provided with its driving mechanism at the top of the column requires appreciably less floor space for its installation and operation, than one having its driving mechanism located in the region of the operator, and therefore a greater number of drills may be installed in a given area.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevation of an upright drilling and tapping machine embodying the present invention. Fig. 2 is an enlarged view of the upper portion of Fig. 1, certain parts being in section better to show a spindle feed mechanism. Fig. 3 is an enlarged sectional view of the upper portion of the drill standard showing the adjustably mounted motor and one form of spindle supporting and driving bracket attached to the standard. Fig. 4 is a view similar to Fig. 3 but showing a different bracket secured upon the standard; this bracket carrying a speed reduction gear train which greatly reduces the speed of rotation of the spindle. Fig. 5 is a view similar to Fig. 3 but showing, attached to the standard, a spindle-supporting and driving bracket embodying a reversing mechanism by means of which the spindle may be caused to rotate in reverse directions. Fig. 6 is a perspective view of the upper portion of the drill disclosed in Fig. 1, as it appears when equipped with manual spindle feed only; the power feed being eliminated. Fig. 7 is a vertical section on the line 7—7 of Fig. 4. Fig. 8 is a detail plan of the spindle-feed drive gears carried by the spindle-supporting bracket and actuated from the spindle drive sleeve. Fig. 9 is a detail side elevation, partly in section, of the means for selectively rendering effective any pair of a plurality of feed gears later to be referred to. Fig. 10 is a horizontal section substantially on the line 10—10 of Fig. 9. Fig. 11 is a detail horizontal section on the line 11—11 of Fig. 2 showing the means for adjustably mounting the motor supporting bracket on the machine standard. Fig. 12 is a side elevation, partly in section, of an improved spindle counter-weight later to be described.

Referring more particularly to the drawings, the invention is disclosed in its preferred form as embodied in an upright drill comprising a base 1 which supports an upright column or standard 2, formed with a finished cylindrical portion 3, upon which is adjustably mounted an arm 4, supporting a work-table 5. A tool-spindle 6 is journaled vertically in bearings supported by the standard, as later will be described, and is adapted to receive, in its lower end, any one of a plurality of tools commonly used by drilling and tapping machines. This spindle is adapted to be rotated and translated with respect to the column to cause its tool to perform the usual operations upon work supported upon the work table.

Power to rotate and translate the spindle is supplied by a motor or other prime-mover 7 adjustably mounted upon the upper end of the standard 2. The motor 7 is preferably carried by a bracket 8 vertically adjustable on guideways 9 provided by the upper portion of the standard. Bolts 10, passing through slots 11 in the bracket 8 and threaded into the standard 2, serve to hold the bracket and motor in any of their adjusted positions for purposes later to be described. The bracket 8 also preferably carries a motor-controller box 12 within which may be suitably secured any preferred type of motor controller. Inasmuch as the motor controller may be of conventional design and as it forms no part of the present invention, illustration and description thereof is deemed unnecessary. A screw 13, threaded into the lower part of the bracket 8 and having its head resting upon a shoulder 14 provided by the standard, serves to adjust the bracket vertically on the standard. A jam-nut 15 assists in maintaining the bracket in its adjusted position. The motor 7 is provided with the usual shaft 16 which, in the present instance, projects forwardly from the motor and is adapted to receive any one of a plurality of gears as $17^a$, $17^b$ and $17^c$ shown in Figs. 3, 4 and 5. These gears are removably secured to the shaft and may be interchanged or replaced by others as may be required.

The standard 2 is provided, at one side of its upper portion, with a finished face 18 upon which may be removably secured, as by bolts 50, any one of a plurality of interchangeable spindle supporting brackets $19^a$, $19^b$, $19^c$ and $19^d$ as shown in Figs. 1, 2, 3, 4 and 5. These brackets are preferably, but not necessarily, in the nature of closed casings and each is fitted with a gear train adapted to connect the spindle with the driving gear on the motor shaft. These gear trains are each different and therefore each produces a different drive in the spindle.

As shown in Fig. 3 one of the spindle brackets may carry a direct drive from the motor shaft to the spindle. In this instance the driving gear $17^a$ meshes with and drives a larger gear 20 fixed upon an intermediate shaft 21 journaled in bearings 22 provided by the bracket $19^b$. Also secured to the shaft 21 is a bevel pinion 23 which drives a bevel gear 24 having its hub 25 journaled in a bearing 26 also provided by the bracket $19^b$. The spindle 6 is splined within the hub of the gear 24 thereby receiving rotary movements from the gear while yet being free to be translated therein by means later to be described. The gear 24 carries a feed drive gear 27 later to be described.

In Figs. 4 and 7 the spindle bracket $19^c$ is shown as embodying a slow speed spindle driving train of gears. This bracket and its spindle driving gear train differs from that shown in Fig. 3 in that the bracket $19^c$ has mounted in it, in bearings 28, a shaft 29 upon which is journaled a speed reduction gear unit 30. This gear unit provides a relatively large gear 31, meshing with the driving gear $17^b$, and a relatively small gear 32 meshing with the gear 20 on the shaft 21. The other elements of the drive are substantially the same as that described in connection with Fig. 3 and therefore the same reference characters have been used to designate the parts.

Figs. 1, 2 and 5 show the drill equipped with a spindle-driving bracket embodying a spindle reversing mechanism, or as it is more commonly termed in the trade, a tapping attachment. This mechanism affords means to reverse the direction of rotation and translation of the spindle and therefore the machine so equipped may be used for tapping, the reverse rotation of the spindle serving to unscrew the tap from the tapped hole. In this construction and arrangement the spindle 6 is splined within a spindle driving sleeve 33 journaled in bearings 34 and 35 in the bracket $19^d$. Loosely journaled upon the sleeve 33 are gears 36 and 37 permanently in mesh with the opposite sides of a bevel pinion 23 carried by a shaft 21, which in turn is driven from the motor by gears $17^c$ and 20. The gears 36 and 37 are constantly driven in opposite directions and either gear selectively may be caused to rotate the spindle driving sleeve. This selective drive is effected by friction clutches 38 and 39 carried by the sleeve and cooperating with the gears 36 and 37 respectively. These clutches are selectively rendered effective to drive the spindle by endwise movement of a bar 40 having clutch actuating cam surfaces 41 and 42. A collar 43, slidably mounted upon the sleeve 33, is attached to the bar 40 and therefore translation of the collar shifts the bar and actuates the clutches 38 and 39. Manual means is provided for shifting the collar 43. This comprises a lever 44 fixed to a shaft 45 journaled horizontally in the bracket. The shaft 45 has secured to it, inside the casing, an arm 46 which carries a shoe or stud 47 fitted within an annular groove 48 in the collar 43. Thus by suitable manipulation of the lever 44 the drill spindle may be caused to rotate either forwardly or backwardly as is desired. The spindle drive sleeve 33 also carries a spindle feed drive gear 27. The specific construction of this reversing mechanism forms the subject of my co-pending application Serial No. 805, filed January 6, 1925.

It is to be noted particularly that the spindle drive mechanism is located wholly at the top of the standard where it is entirely out of the way of the operator thus removing from him mechanism that heretofore was a constant source of danger and which likewise occupied valuable space about the base of the machine tool. This location of the driving motor also permits a direct drive from the motor to the spindle, thereby eliminating belts, pulley, shafts, etc., and effecting a strong rigid and very desirable construction.

Should it be desired to change the ratio between the driving gear on the motor shaft and the initial driven gear of the gear train, this may readily be effected by removing the driving gear from the motor shaft and replacing it with a gear of different size; the vertical adjustment of the motor with the bracket 8 permitting the gears to be suitably meshed (see dotted line position of motor in Fig. 5).

The standard 2 is formed, intermediate its ends with a finished face 49 similar to the face 18. Upon the face 49 is adapted to be secured, in any one of three predetermined positions, a spindle feed head 51 within which is translatably mounted a spindle feed sleeve 52. The spindle 6 is rotatably journaled in the sleeve 52. Thrust bearings 53 and 54 carried by the spindle at opposite ends of the sleeve 52 prevent relative endwise movement between the sleeve and the spindle. The head is adapted to be secured to the standard by bolts 55 and to provide for a plurality of settings of the head on the standard as may be required in setting up the machine for any particular operation, three sets of bolt holes 56 are formed in the face 49 of the standard (see particularly Fig. 6). Within the head 51 is journaled a shaft 57 which carries a pinion 58 meshing with a rack 59 affixed to the sleeve 52. A pilot lever 60, attached to the shaft 57, affords means whereby the sleeve 52 and thereby the spindle 6 may be translated manually. When so desired, power means may be provided to translate the tool spindle. To provide for the attachment of this power feed the head 51 is preferably formed with the necessary finished surfaces and bolt holes (see Fig. 6) to which may be secured a power feed bracket 61 carrying a horizontal shaft 62 upon which is secured a worm 63 and a bevel-gear 64. The worm is adapted to drive a worm wheel 63ᵃ which (when a power feed is desired) is secured to the shaft 57. The bevel-gear 64 is driven by a similar gear 65 carried by one portion of a vertically disposed telescopic feed shaft 66. This shaft comprises sections 66ᵃ and 66ᵇ splined together as at 67 thereby permitting the head 51 to be adjusted vertically without disturbing the driving connection between the sections 66ᵃ and 66ᵇ. Power to rotate the shaft 66 is taken from the gear 27, hereinbefore referred to, and transmitted through gears 68, 69 and 70 to a cone of gears 71. This cone comprises gears 71ᵃ, 71ᵇ, 71ᶜ, 71ᵈ and 71ᵉ maintained permanently in mesh with gears 72ᵃ, 72ᵇ, 72ᶜ, 72ᵈ and 72ᵉ respectively. The last named gears are loosely journaled upon the shaft section 66ᵃ and are adapted selectively to be secured thereto by means of a drive key 73 pivoted upon a rack-bar 76 slidable lengthwise in the section 66ᵃ. The key has a head 74 projecting through a slot 75 in the section 66ᵃ and entering slots formed in the inner periphery of the gears. The rack-bar 76 is preferably cylindrical, having the rack teeth running entirely around it, thereby permitting the rack-bar to rotate while in engagement with a pinion 77 held in a horizontal bore 78 in the spindle bracket. The pinion 77 is preferably of considerable length and also has meshing with it an actuating rack-bar 79 slidably mounted in a vertical bore 80, also in the spindle bracket. A bell-crank lever 81, fulcrumed at 82 to the outside of the bracket has one arm pivotally attached to the rack-bar 79 and affords means to shift the key 73 to effect any desired spindle feed. A spring detent 83 engaging the rack-bar 79 holds the parts in their adjusted positions.

The spindle 6 is counterbalanced by a weight 84 attached to one end of a chain or other flexible connector 85 which passes over rollers 86 and 87 supported by the spindle bracket and the standard respectively, and has its other end attached to the spindle feeding sleeve 52. The roller 86 is located above the spindle sleeve 52 and adjacent the axis of the motor and the roller 87 is located beneath the motor and adjacent the axis of the column. The flexible connector 85 extends from the sleeve 52 over the roller 86, then obliquely downward and toward the rear of the machine passing through suitable apertures in the spindle bracket and thence over the roller 87 and downwardly in the column where it is attached to the counterweight 84. This arrangement of the pulleys 86 and 87 permits the spindle sleeve to be elevated to a position closely beneath the spindle bracket, maintains the connector out of the way and inconspicuous and permits the motor to be housed within the upper end of the standard and adjusted vertically therein without interfering with the action of the counterbalance. The counterweight 84 is vertically movable in the hollow standard 2 and, to give access to the weight, and to the connector to which it is attached, the standard is formed in its rear wall with a portal 88. The construction of the counterweight which permits its ready attachment to the connector is another feature of this invention. The weight is formed at its upper end with an angular passage way 89 extending, from the end of the weight, downwardly and out through the side thereof. This passage may be formed by drilling one bore into the end of the weight and another bore into the side thereof, these two bores meeting in the weight and forming a continuous passage. Also the passage-way may be made by casting the weight about a suitable core. In either case the vertical bore 90 will be substantially smaller than the horizontal bore 91. The chain 85 carries a head or block 92 which is of a size that it will pass through the bore 91 but will be obstructed by the walls of the smaller vertical bore 90. Thus the weight is attached to the connector 85, in a very positive and simple manner.

From the foregoing it will be perceived that there has been provided an upright drilling and tapping machine which is adapted to receive any one of a plurality of interchangeable and differently fitted spindle drive brackets; which embodies very direct and compact driving connections between the prime-mover and the spindle; which provides for the ready change of gear ratio; and in which all of the spindle driving mechanism is located in a position remote from the operator and away from the base of the machine.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A drilling machine combining a standard; a spindle rotatably journaled in bearings supported by said standard; a bracket adjustably carried by said standard adjacent its upper end; a motor mounted upon said bracket; a driving connection including driving and driven gears of a given ratio between said motor and said spindle; means permitting the removal of one of said gears and its subsequent replacement by a gear of different size to change the ratio of the driving and driven gears thereby to vary the speed of the spindle; and means to adjust said bracket on said standard in accordance with the change in the gear ratio.

2. An upright drill combining a standard; a spindle rotatably journaled in bearings supported by said standard; guideways formed on said standard adjacent its upper end; a bracket slidably fitted upon said guideways; means permitting said bracket to be vertically adjusted on said guideways; means to secure said bracket in its adjusted position; a motor carried by said bracket; and a gear drive between said motor and said spindle.

3. An upright drill combining a standard; a spindle rotatably journaled in bearings supported by said standard; guideways formed on said standard adjacent its upper end; a bracket slidably fitted upon said guideways; an adjusting screw engaging said bracket and said standard and affording means for adjusting said bracket on said standard; a motor and a motor controller box carried by said bracket; and a gear drive from said motor to said spindle.

4. In combination with an upright drill including a standard adapted to receive a spindle supporting bracket, a motor adjustably mounted upon said standard and a gear secured upon the motor shaft; of a plurality of interchangeable brackets each adapted to receive a drill spindle and each fitted with a different gear train affording driving means for the spindle; means permitting any one of said brackets to be attached to said standard with one of the gears of the gear train in the plane of the gear on the motor shaft; and means permitting adjustment of said motor to bring its gear into driving relation with said one of the gears of said gear train.

5. In combination with an upright drill including a standard, a driving motor adjustably mounted on said standard and a gear on the motor shaft; of a plurality of spindle supporting brackets each of which is provided with a spindle driving train of gears; means permitting any one of said brackets to be secured upon said standard adjacent the motor; and means to adjust said motor to bring its gear into engagement with one of the gears of the train carried by the bracket secured upon the standard.

6. An upright drill combining a column having an aperture through its upper portion; a bracket adjustably secured to the rear side of said column intermediate its ends; a motor secured to said bracket, said motor having a portion projecting through said aperture to the opposite side of said column;

a motor controller box carried by said bracket; a spindle rotatably journaled in bearings at the front of said column; a driving connection between said motor and said spindle; and means simultaneously to adjust said bracket, controller-box and motor vertically on the column.

7. An upright drill combining a standard provided in one side with a plurality of sets of bolt holes; means permitting a plurality of spindle-supporting brackets selectively to be secured upon said standard; a spindle rotatably journaled in each of said brackets; a common driver for all of said spindles; a work-table adjustably mounted upon said standard; a spindle feed head removably but non-translatably bolted to said standard intermediate said bracket and said work-table by means of bolts entering one of said sets of holes; and means for permitting said head to be removed from said standard and reattached thereto in a different vertical position as determined by the various sets of holes in said standards.

8. An upright drill combining a standard provided with a plurality of sets of bolt holes; a spindle-supporting bracket secured upon said standard; a spindle rotatably journaled in said bracket; a motor mounted upon said standard; a spindle rotating gear carried wholly by said bracket and connected directly with said motor; a spindle-feed head bolted to said standard by means of bolts threaded into one of said sets of bolt holes; and means permitting said head to be removed from said standard and reattached thereto in a different position or permitting the attachment of a different head, said sets of holes being located in predetermined positions to correspond with the respective head or position of the same head.

9. A standard for upright drills comprising an upright column provided adjacent its upper end with an enlarged portion affording a housing for a motor and having portals in its front and rear walls through which a motor may project; a spindle rotatably mounted in supporting bearings adjacent said front wall; transmission means therefor; a motor adjustably mounted on said standard and adapted to project through said rear portal; and an operative connection between said motor and spindle transmission means, said housing and rear portal being greater in length than the outer diameter of said motor to permit vertical adjustment of the motor, thereby to permit variations of speed ratio in said operative connections.

10. An upright drill combining a column; a casing secured to and abutting against the upper forward part of said column and having enclosed therein a spindle and operating mechanism therefor; a motor supported on said column at the side opposite to said casing and extending into an opening in the upper part of said column; a driving connection including a detachable gear between said motor and said operating mechanism; and means for vertically adjusting said motor on said column to permit replacement of said gear by one of a different size, said column extending over and around the inner end of said motor, the opening being of sufficient extent to permit the said adjustment of the motor.

In witness whereof, I have hereunto subscribed my name.

DAVID C. KLAUSMEYER.